US009664550B2

(12) United States Patent
Cole et al.

(10) Patent No.: US 9,664,550 B2
(45) Date of Patent: May 30, 2017

(54) ADJUSTABLE METER WITH TAMPER DETECTION

(71) Applicant: Mueller International, LLC, Atlanta, GA (US)

(72) Inventors: Martin Cole, Ocala, FL (US); James Ola Williams, Marlborough, MA (US); Normand James Roy, Coventry, RI (US); Rolando Armas, Ocala, FL (US)

(73) Assignee: Mueller International, LLC, Atlanta, GA (US)

( * ) Notice: Subject to any disclaimer, the term of this patent is extended or adjusted under 35 U.S.C. 154(b) by 196 days.

(21) Appl. No.: 14/490,095

(22) Filed: Sep. 18, 2014

(65) Prior Publication Data
US 2016/0084694 A1 Mar. 24, 2016

(51) Int. Cl.
| | | |
|---|---|---|
| *G01F 15/18* | (2006.01) | |
| *G01F 15/14* | (2006.01) | |
| *G01F 15/00* | (2006.01) | |
| G01F 15/10 | (2006.01) | |
| E03B 7/07 | (2006.01) | |
| E03B 7/09 | (2006.01) | |

(52) U.S. Cl.
CPC ............ *G01F 15/14* (2013.01); *G01F 15/007* (2013.01); *E03B 7/072* (2013.01); *E03B 7/095* (2013.01); *G01F 15/10* (2013.01); *G01F 15/18* (2013.01); *G01F 15/185* (2013.01)

(58) Field of Classification Search
None
See application file for complete search history.

(56) References Cited

U.S. PATENT DOCUMENTS

| | | | | | |
|---|---|---|---|---|---|
| 676,656 | A | * | 6/1901 | Haas | G01F 3/12 418/53 |
| 3,045,486 | A | * | 7/1962 | Thomas | G01F 15/14 73/273 |
| 3,067,612 | A | * | 12/1962 | Smith | G01F 15/14 73/273 |
| 3,308,664 | A | * | 3/1967 | Kullmann | G01F 3/12 73/201 |
| 4,663,970 | A | * | 5/1987 | Sutherland | G01F 15/14 73/273 |

(Continued)

FOREIGN PATENT DOCUMENTS

| | | |
|---|---|---|
| EP | 0359665 | 12/1992 |
| KR | 100959519 | 5/2010 |

OTHER PUBLICATIONS

Cullinan, Thomas; U.S. Patent Application entitled: Solid-State Register Initiated Poll of Status Information having U.S. Appl. No. 14/954,322, filed Nov. 30, 2015, 26 pgs.

(Continued)

*Primary Examiner* — Jill Culler
(74) *Attorney, Agent, or Firm* — Taylor English Duma LLP

(57) ABSTRACT

Disclosed is a meter assembly including a first housing; a second housing; and a retaining fastener connecting the second housing to the first housing, the second housing adapted to rotate relative to the first housing. Also disclosed is a meter assembly including a housing; a linkage arm; and a retaining fastener, the retaining fastener connecting the linkage arm to the housing, the linkage arm adapted to rotate relative to the housing.

20 Claims, 9 Drawing Sheets

(56) References Cited

U.S. PATENT DOCUMENTS

| | | | |
|---|---|---|---|
| 4,995,643 A * | 2/1991 | Rappart | G01F 15/185 285/30 |
| 5,086,292 A | 2/1992 | Johnson et al. | |
| 5,099,348 A | 3/1992 | Huddleston et al. | |
| 5,339,686 A * | 8/1994 | DeJarlais | G01F 15/185 73/201 |
| 5,473,322 A | 12/1995 | Carney | |
| 5,631,554 A | 5/1997 | Briese et al. | |
| 5,774,807 A | 6/1998 | Yazaki et al. | |
| 5,910,653 A | 6/1999 | Campo | |
| 6,588,447 B1 | 7/2003 | Hendey | |
| 6,706,273 B1 | 3/2004 | Roessler | |
| 7,007,558 B1 | 3/2006 | Carpenter | |
| 8,344,881 B1 | 1/2013 | Hays | |
| 9,476,740 B2 | 10/2016 | Zigovszki | |
| 2002/0126157 A1 | 9/2002 | Farago et al. | |
| 2002/0193144 A1 | 12/2002 | Belski | |
| 2003/0193405 A1 | 10/2003 | Hunt | |
| 2004/0021568 A1 | 2/2004 | Seal et al. | |
| 2005/0066746 A1 | 3/2005 | Winter | |
| 2007/0229256 A1 | 10/2007 | Seal et al. | |
| 2007/0241930 A1 | 10/2007 | Qureshi et al. | |
| 2010/0321205 A1 | 12/2010 | Olson et al. | |
| 2011/0115643 A1 | 5/2011 | Gilbert | |
| 2012/0074927 A1 | 3/2012 | Ramirez | |
| 2013/0088353 A1 | 4/2013 | Lafrance | |
| 2013/0113631 A1 | 5/2013 | Pitchford | |
| 2013/0257630 A1 | 10/2013 | Brennan et al. | |
| 2014/0028465 A1 | 1/2014 | Cornwall | |
| 2014/0281624 A1 | 9/2014 | Cahill-O'Brien et al. | |
| 2014/0361908 A1 | 12/2014 | Laird et al. | |

OTHER PUBLICATIONS

Zigovszki, Szabolcs; International Search Report and Written Opinion for serial No. PCT/US15/44156, filed Mar. 7, 2015, mailed Nov. 6, 2015, 9 pgs.

Zigovszki, Szabolcs; International Search Report and Written Opinion for serial No. PCT/US15/50080, filed Sep. 15, 2015, mailed Dec. 10, 2015, 8 pgs.

Zigovszki, Szabolcs; International Search Report and Written Opinion for serial No. PCT/US15/44147, filed Mar. 7, 2015, mailed Nov. 6, 2015, 8 pgs.

Martin, Cole; International Search Report and Written Opinion for Application No. PCT/US15/44154, filed Aug. 7, 2015, mailed Dec. 31, 2015, 12 pgs.

Zigovszki, Szabolcs; PCT Application entitled: Real-Time Flow Compensation in Usage Accumulcation having serial No. PCT/US15/44156, filed Aug. 7, 2015, 26 pgs.

Zigovszki, Szabolcs; PCT Application entitled: Tamper Detection Through Magnetic Sensing having serial No. PCT/US15/50080, filed Sep. 15, 2015, 26 pgs.

Zigovszki, Szabolcs; PCT Application entitled: Reverse Flow Detection and Annunication having serial No. PCT/US15/44147, filed Aug. 7, 2015, 24 pgs.

Martin, Cole; PCT Application entitled: Adjustable Meter With Tamper Detection having serial No. PCT/US15/44154, filed Aug. 7, 2015, 35 pgs.

Xigovszki, Szabolcs; U.S. Patent Application entitled: Real-Time Flow Compensation in Usage Accumulation, U.S. Appl. No. 14/490,375, filed Sep. 18, 2014, 28 pgs.

Zigovszki, Szabolcs; U.S. Patent Application entitled: Mode Activation Using Light Detection, U.S. Appl. No. 14/490,381, filed Sep. 18, 2014, 31 pgs.

Zigovszki, Szabolcs; U.S. Patent Application entitled: Tamper Detection Through Magnetic Sensing, U.S. Appl. No. 14/490,403, filed 9/1812014; 24 pgs.

Zigovszki, Szabolcs; U.S. Patent Application entitled: Reverse Flow Detection and Annunciation, U.S. Appl. No. 14/490,412, filed Sep. 18, 2014; 26 pgs.

Zigovszki, Szabolcs; Non-Final Office Action for U.S. Appl. No. 14/490,403, filed Sep. 18, 2014, mailed Mar. 31, 2016, 26 pgs.

Zigovszki, Szabolcs; Non-Final Office Action for U.S. Appl. No. 14/490,412, filed Sep. 18, 2014, mailed Apr. 1, 2016, 21 pgs.

Zigovszki, Szabolcs; Non-Final Office Action for U.S. Appl. No. 14/490,381, filed Sep. 18, 2014, mailed Jul. 13, 2016, 28 pgs.

Zigovszki, Szabolcs; Corrected Notice of Allowability for U.S. Appl. No. 14/490,412, filed Sep. 18, 2014, mailed Aug. 3, 2016, 4 pgs.

Zigovszki, Szabolcs; Corrected Notice of Allowability for U.S. Appl. No. 14/490,412, filed Sep. 18, 2014, mailed Sep. 20, 2016, 7 pgs.

Zigovszki, Szabolcs; Notice of Allowance for U.S. Appl. No. 14/490,412, filed Sep. 18, 2014, mailed Jul. 11, 2016, 9 pgs.

Zigovszki, Szabolcs; Applicant Initiated Interview Summary for U.S. Appl. No. 14/490,403, filed Sep. 18, 2014, mailed Dec. 1, 2016, 7 pgs.

Zigovszki, Szabolcs; Final Office Action for U.S. Appl. No. 14/490,403, filed Sep. 18, 2014, mailed Oct. 3, 2016, 23 pgs.

Zigovszki, Szabolcs; Issue Notification for U.S. Appl. No. 14/490,412, filed Sep. 18, 2014, mailed Oct. 5, 2016, 1 pg.

Cullinan, Thomas; Non-Final Office Action for U.S. Appl. No. 14/954,322, filed Nov. 30, 2015, mailed Nov. 2, 2016; 37 pgs.

Zigovszki, Szabolcs; Final Office Action for U.S. Appl. No. 14/490,381, filed Sep. 18, 2014, mailed Jan. 31, 2017, 26 pgs.

Zigovszki, Szabolcs; Notice of Allowance for U.S. Appl. No. 14/490,403, filed Sep. 18, 2014, mailed Feb. 6, 2017, 9 pgs.

Zigovszki, Szabolcs; International Preliminary Report on Patentability for Application No. PCT/US15/44156, filed Mar. 7, 2015, mailed Mar. 30, 2017, 8 pgs.

Zigovszki, Szabolcs; International Preliminary Report on Patentability for Application No. PCT/US15/50080, filed Sep. 15, 2015, mailed Mar. 30, 2017, 7 pgs.

Zigovszki, Szabolcs; International Preliminary Report on Patentability for Application No. PCT/US15/44147, filed Mar. 7, 2015, mailed Mar. 30, 2017, 7 pgs.

Martin, Cole; International Preliminary Report on Patentability for Application No. PCT/US15/44154, filed Aug. 7, 2015, mailed Mar. 30, 2017, 9 pgs.

* cited by examiner

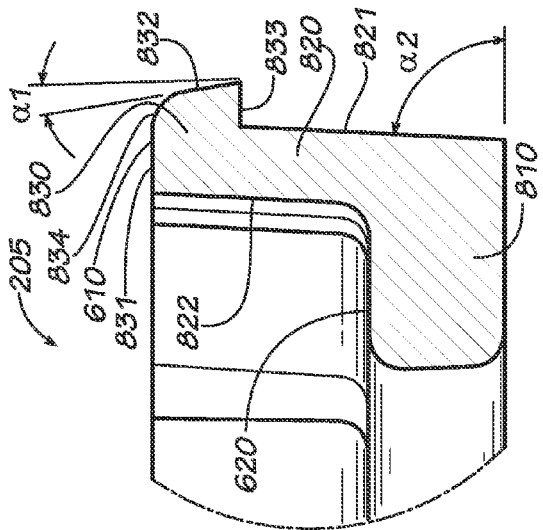
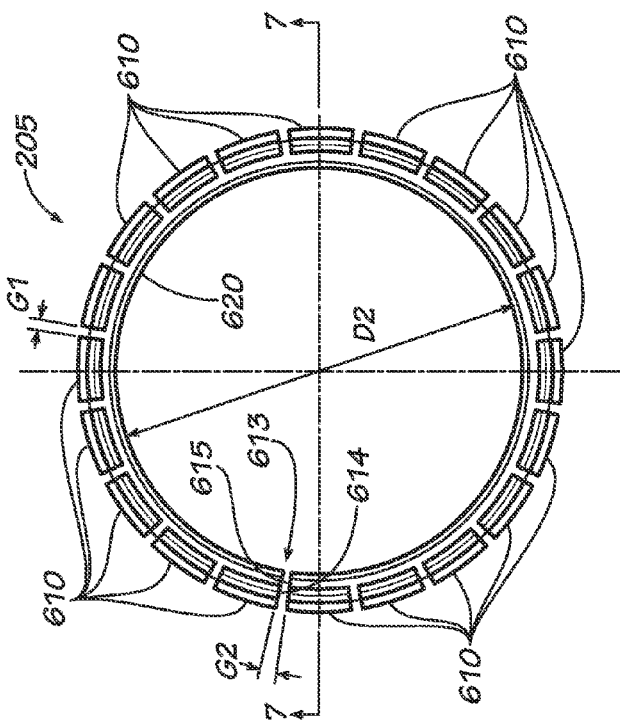
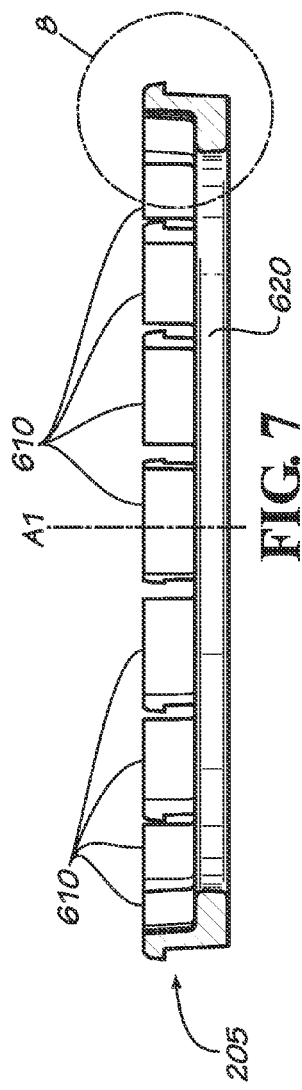
FIG. 8
FIG. 7
FIG. 6

ADJUSTABLE METER WITH TAMPER DETECTION

TECHNICAL FIELD

This disclosure relates to water control and metering. More specifically, this disclosure relates to physical adjustment and locking mechanisms for use in a meter assembly.

BACKGROUND

It can be advantageous to be able to track the flow of a fluid, such as water, through a fluid distribution system. Water is typically supplied and tracked by a public or private water utility, typically for a fee and often with the oversight of the local municipality. Water providers deliver water to businesses and individuals via piping systems. A piping system could be an upstream piping system, including a system to carry water from a water provider to a meter, or a downstream piping system, including a system to carry water from a meter to a user terminal. Because water providers typically sell water by unit volume, there exists a need to measure water flow to a user terminal to generate a water bill. The user terminal may include an individual residence, a place of business or any other point of termination of the water flow. Typically, a water meter is placed in the water supply line between the water source and the user terminal to measure all water flowing to that user terminal. Meters are read and checked against prior readings to determine the total flow of water to the user terminal.

When a meter such as a water meter is installed or serviced, it can be advantageous for the position or orientation of various components of the meter to be adjustable in order to provide more convenient access to a portion of the meter or to improve the effectiveness of the meter. Some meters are installed in an enclosure that provides limited clearance around the meter. In addition, because a meter is sometimes the primary device to determine the usage of a fluid by each user and by extension the payment due from each user, it can be advantageous to prevent tampering with or any kind of modification of the meter by unauthorized individuals. Tampering of a meter, especially tampering that goes undetected, can result in some consumers paying too little or too much for the product that they consume.

SUMMARY

Disclosed is a meter assembly including a first housing; a second housing; and a retaining fastener connecting the second housing to the first housing, the second housing adapted to rotate relative to the first housing.

Also disclosed is a meter assembly including a housing; a linkage arm; and a retaining fastener connecting the linkage arm to the housing, the linkage arm adapted to rotate relative to the housing.

Also disclosed is a method of assembling a meter assembly including a register housing and a meter housing, the method including aligning the register housing with a meter housing; securing the meter housing to the register housing with a retaining fastener by pushing the register housing onto the meter housing; and rotating the register housing relative to the meter housing to a desired rotation angle.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 6 is a top view of the retaining ring of the meter assembly of FIG. 1.

FIG. 7 is a sectional view of the retaining ring of FIG. 6 taken along line 7-7 in FIG. 6.

FIG. 8 is a detailed sectional view of the retaining ring taken from detail 8 of FIG. 7.

DETAILED DESCRIPTION

Disclosed is a meter assembly and associated methods, systems, devices, and various apparatus. It would be understood by one of skill in the art that the meter assembly and the physical adjustment and locking mechanisms described herein are described in but a few exemplary embodiments among many. No particular terminology or description should be considered limiting on the disclosure or the scope of any claims issuing therefrom.

Figure 1:
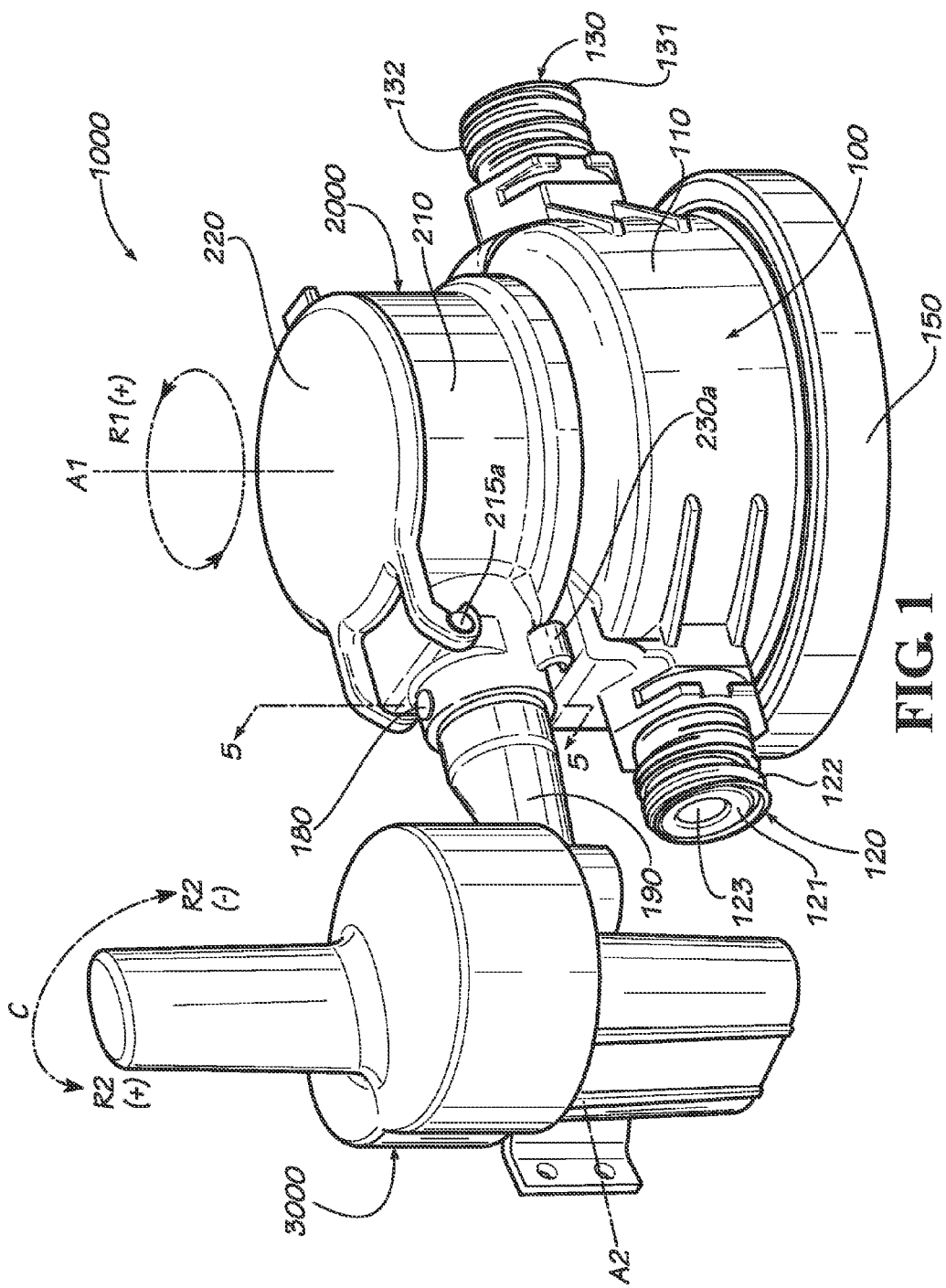
FIG. 1 is a perspective view of a meter assembly including a meter device, a register device, and a wireless communication device included in accordance with one embodiment of the disclosure.

One embodiment of a meter assembly 1000 is disclosed and described in FIG. 1. Meter assembly 1000 includes a meter device 100 and a register device 2000. Meter device 100 includes meter housing 110, and register device 2000 includes register housing 210. Register housing 210 of register device 2000 is connected to the top of meter housing 110 of the meter device 100. Various embodiments of meter assembly 1000 also include a communication device. The communication device in some embodiments may be a wireless communication device 3000. In the current embodiment, the wireless communication device 3000 is part of a mesh network where the mesh network includes a remotely-located communicator. The remotely-located communicator may be operated by a municipality, a technician, a service provider, or another entity. The remotely-located communicator may be any communication device or system including a computer, a server, a gateway, another meter assembly, a handheld device, a mesh network, or any other device or system capable of communicating with the wireless communication device 3000. In various embodiments, a linkage arm 190 is provided for attachment of the wireless communication device 3000 to the register device 2000. A retaining pin 180 secures the linkage arm 190 to the register housing 210 in various embodiments, though other retaining fasteners may secure the linkage arm 190 to the register housing 210 in various embodiments.

In various embodiments, the wireless communication device 3000 is secured to the linkage arm 190 through a snap-fit connection. In various embodiments, the wireless communication device 3000 is secured to the linkage arm 190 through the use of fasteners including but not limited to screws or pins. In various embodiments, the wireless communication device 3000 incorporates the linkage arm 190 or the linkage arm 190 incorporates the wireless communication device 3000. In various embodiments, the connection is separable without damage to either the wireless communication device 3000 or the register device 2000. In various embodiments, the connection is not separable without damage to at least part of the connection, i.e. any tampering with the connection between wireless communication device 3000 and register device 2000 design that causes the connection to break will be detectable and also inherently tamper-resistant.

The meter housing 110 of meter device 100 forms the main body through which water flows, from inlet 120 to outlet 130. The threaded connections shown are inlet threading 122 and outlet threading 132, although other types of connections are considered within the scope of this disclosure. In various embodiments, inlet threading 122 and outlet threading 132 will meet the industry-standard specifications of the external straight pipe threads (NPSM) of ANSI B1.20.1. In various other embodiments, inlet threading 122 and outlet threading 132 will vary from the external straight pipe threads (NPSM) of ANSI B1.20.1. In this disclosure, references to "top", "bottom", "up", "down", "upward", "downward", "horizontal", or "vertical" refer to the meter assembly 1000 as oriented in FIG. 1. Various features of the meter assembly 1000 may be altered, reoriented, reconfigured, replaced, rotated, or moved in alternative embodiments. No one configuration is intended to be limiting on this disclosure.

The meter device 100 includes a meter (not shown) that is located inside meter housing 110. A bottom cap 150 covers a bottom opening defined in the meter housing 110, the bottom cap 150 and meter housing 110 fully enclosing the meter. Although the current embodiment includes a meter housing 110 with a partially integrated construction using plastic welding of components, various embodiments are included in this disclosure and may include but are not limited to a partially integrated construction with a separately attached cover.

Register device 2000 includes the register housing 210 and a register lid 220. Register lid 220 pivots open and closed about a pair of hinge pins 215a,b (215b shown in FIG. 4) so that a display interface 315 (shown in FIG. 3) of an electronic module 310 (shown in FIG. 3) is exposed for viewing. In various embodiments, the register housing 210 is substantially circular in horizontal cross section to facilitate rotation of register housing 210 with respect to meter housing 110, but in other embodiments the shape of register housing 210 will not be substantially circular or only that portion of register housing 210 that rotates with respect to meter housing 110 will be substantially circular, and the shape of the register housing 210 should not be considered limiting on the current disclosure.

Figure 9:
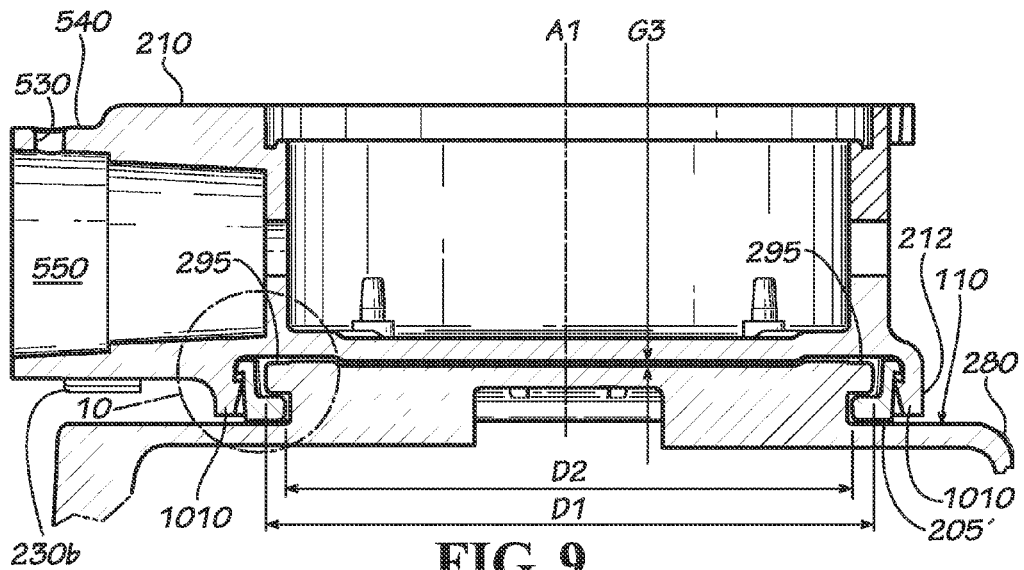
FIG. 9 is a sectional view of the assembled register housing and retaining ring, together assembled with a meter housing, taken along line 9-9 of FIG. 2 and line 9-9 of FIG. 5.

Also included in various embodiments of register device 2000 are hooks 230a,b (230b shown in FIG. 9). Hooks 230a,b may be used as a wire management device to secure wiring between the register device 2000 and the wireless communication device 3000 or to simply secure wiring for which no connection is required but where it is advantageous to keep wiring off the ground or out of the way of other components. Additionally, hooks 230a,b may serve as a strain relief device by bearing the load of the meter assembly 1000 or any portion thereof instead of a soldered wire connection bearing the load when someone picks up the meter assembly 1000 or any portion thereof by the wiring.

In various embodiments, it is possible for register device 2000—and those other elements of meter assembly 1000 which are attached to register device 2000—to rotate counterclockwise (CCW) or clockwise (CW) with angular displacement R1 in a horizontal plane about an axis A1 shown. In various embodiments, it is also possible for wireless communication device 3000 and linkage arm 190 to rotate counterclockwise (CCW) or clockwise (CW) with angular displacement R2 in a vertical plane about an axis A2 shown. In various embodiments, there is no maximum possible angular displacement R1 or R2 and the wireless communication device 3000 and the linkage arm 190 are free to rotate to any angle. In various other embodiments, there is a maximum possible angular displacement R1 or R2 and a mechanical stop may be present to prevent rotation of either the wireless communication device 3000 or the linkage arm 190 past a desired angular displacement R1 or R2. Whether or not there is a maximum possible angular displacement R1 or R2, there is in various embodiments a maximum recommended angular displacement for best performance depending on the application, and in various other embodiments there is not a maximum recommended angular displacement.

Water flows through the meter housing 110 by flowing into the inlet 120 and out of the outlet 130. The inlet 120 includes an inlet end 121, an inlet threading 122, and an inlet opening 123. The outlet 130 includes an outlet end 131, an outlet threading 132, and an outlet opening (not shown). The inlet threading 122 and the outlet threading 132 allow for attachment to a piping system, including an upstream piping system or a downstream piping system or both. Water flows into the inlet 120 from a provider or water source and out of the outlet 130 to a home, office building, or other user terminal. Both the inlet 120 and the outlet 130 are attachable to the piping system via the inlet threading 122 and outlet threading 132, respectively, with a coupling nut (not shown) in various embodiments.

In the current embodiment, the meter housing 110 is dimensioned so that it can fit within a standard water meter lay-length, though the meter housing 110 may be dimensioned differently in various embodiments depending on the space provided for the meter housing 110. The standard water meter lay-length of a standard water meter is designated in various industry standards documents, including the American Water Works Association (AWWA). The AWWA C700 standard requires 7.5 inches standard water meter lay-length for meters with ⅝-inch piping diameter. Other AWWA standards, such as C708 and C710, also specify the same laying lengths for meters of like sizes.

Figure 2:
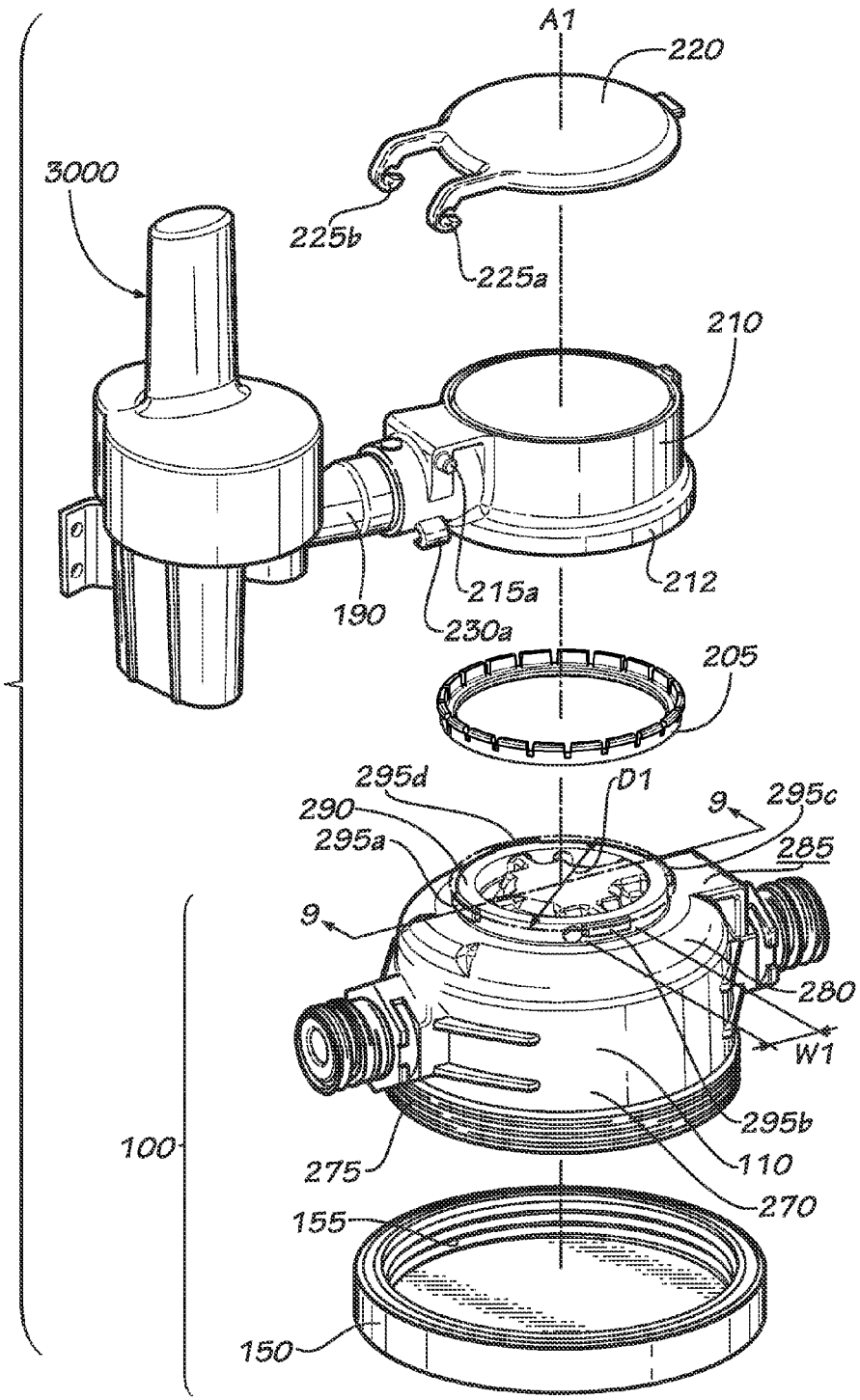
FIG. 2 is an exploded view of the meter assembly of FIG. 1.

Disclosed in FIG. 2 is an exploded view of the meter assembly 1000. Meter assembly 1000 is shown with bottom cap 150 removed from meter housing 110. When assembled, threading 155 of bottom cap 150 is assembled to threading 275 of a bottom portion 270 of meter housing 110 of meter device 100. Other methods for attaching a bottom cap 150 or bottom plate (not shown) to the meter housing 110 are considered as part of this disclosure including, but not limited to, a screw and bore attachment or a welded attachment. To facilitate wireless communication capabilities, the meter housing 110 may be composed of brass, bronze, plastic, aluminum, or other non-ferrous material. The meter housing 110 may also be made of ferrous materials based on the specific application.

Meter housing 110 also includes top portion 280. In various embodiments, top portion 280 includes a mounting boss 290, which functions as a register connection interface. In various embodiments, mounting boss 290 includes a plurality of engagement hooks 295a,b,c,d. Engagement hooks 295a,b,c,d can also be described as engagement teeth, engagement protrusions, or engagement tabs. In various embodiments, mounting boss 290 includes only one engagement hook. In various embodiments, mounting boss 290 includes no engagement hook. In various embodiments, mounting boss 290 protrudes axially from a top surface 285 of top portion 280 of meter housing 110 along axis A1. In various embodiments, engagement hooks 295a,b,c,d protrude radially from mounting boss 290 with respect to axis A1 to provide structure to which retaining ring 205 can attach. Engagement hooks 295a,b,c,d of register housing 210 define a circle of diameter D1 around axis A1 and have a width W1. In various embodiments, W1 will be the same for each engagement hook 295. In various other embodiments, W1 will vary for one or more engagement hooks 295a,b,c,d. In various embodiments, engagement hooks 295a,b,c,d of top portion 280 of meter housing 110 could be replaced in various embodiments with a tooth-like protrusion having the same cross-section as engagement hooks 295a,b,c,d but extending around the full perimeter of top portion 280. The meter housing 110 of meter device 100 is sized to accommodate the meter that is located inside meter housing 110. The thickness of each of the walls of meter housing 110 is sized to accommodate the water pressure of the piping system and may be variable or constant depending on the method of manufacture and other factors.

The meter housed within meter housing 110 of meter assembly 1000 is a nutating disc displacement flow meter in the current embodiment. However, other meter types may be used with the meter device 100 of meter assembly 1000 in various embodiments. In various embodiments, the retaining ring 205 attaches register device 2000 to meter device 100 along axis A1 and the linkage arm 190 is used to attach the wireless communication device 3000 to the register device 2000 along axis A2. Retaining ring 205 can also be considered to be part of a broader category of retaining fasteners.

Figure 3:
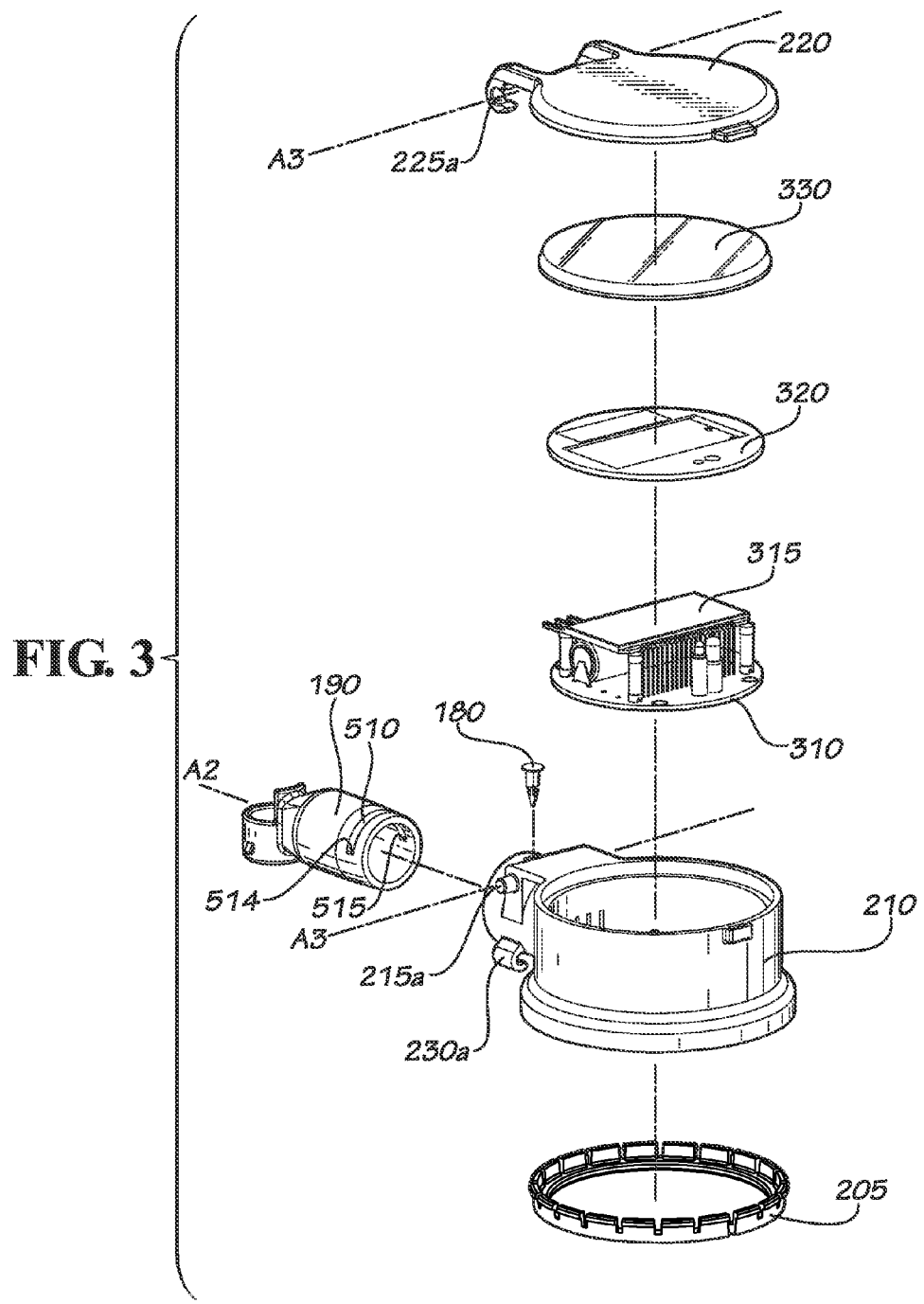
FIG. 3 is an exploded view of the register device of the meter assembly of FIG. 2, also showing a linkage arm and a retaining ring.

Disclosed in FIG. 3 is an exploded view of the register device 2000, the linkage arm 190, and the retaining ring 205 of the meter assembly 1000. Register device 2000 is shown with the register housing 210 which itself incorporates the hinge pins 215a,b (215b shown in FIG. 4). In various embodiments, register device 2000 is assembled along axis A1 and also includes the electronic module 310 which itself incorporates the display interface 315. In various embodiments, register device 2000 also includes a faceplate 320, a lens 330, and the register lid 220. In various embodiments, display interface 315 includes a display of figures associated with the operation of the meter assembly 1000, including the amount of fluid that has flowed through the meter assembly 1000 as measured by the meter assembly 1000. In the current embodiment, the display interface 315 is a liquid crystal display ("LCD"), though the display interface 315 may be a different type of interface in other embodiments, such as a mechanical revolution counter. In various embodiments, lens 330 is sufficiently transparent to allow the display interface 315 to be viewed. In various embodiments, a set of hinge bores 225a,b (225b shown in FIG. 2) is mountable on hinge pins 215a,b such that register lid 220 rotates open to expose the aforementioned internal components of register device 2000. In the current embodiment, register lid 220 rotates between the open and closed positions about axis A3.

Figure 4:
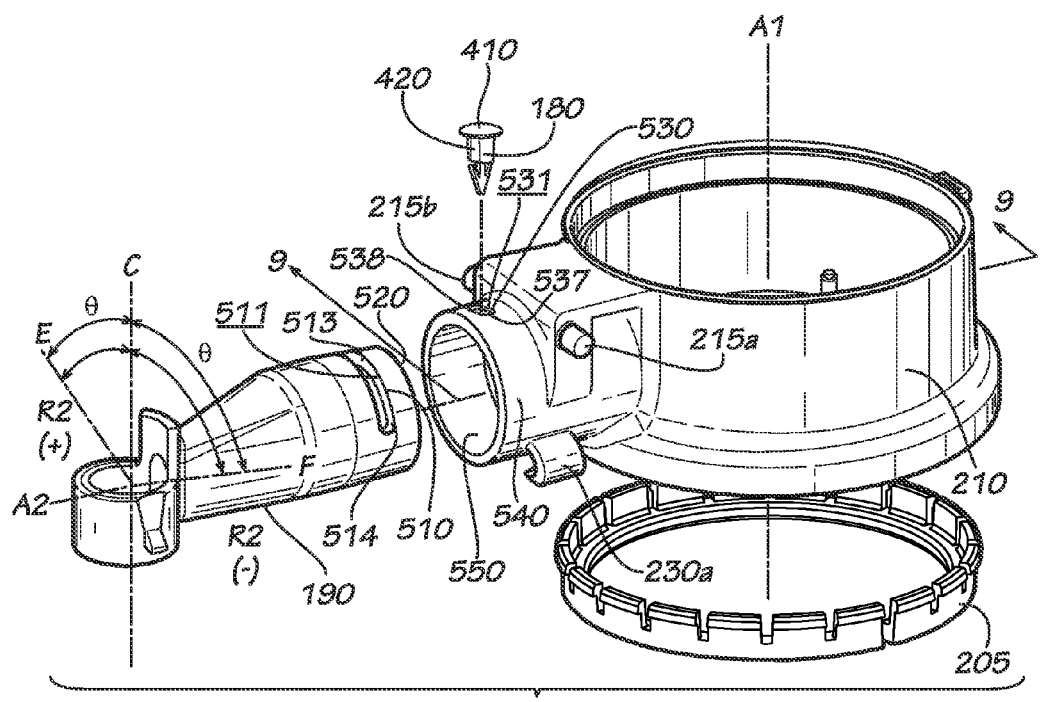
FIG. 4 is an exploded view of a register housing of the register device with the linkage arm and retaining ring of the meter assembly of FIG. 1.

Disclosed in FIG. 4 is an exploded perspective view of the register housing 210 of the register device 2000 of FIG. 1 and the linkage arm 190 of the meter assembly 1000 of FIG. 1. Register housing 210 includes a socket 540, which includes a bore 550 sized to accept a register end 520 of linkage arm 190 and concentric to axis A2. Register housing 210 also includes a bore 530 sized to accept retaining pin 180. Bore 530 of register housing 210 includes a bore surface 531, a first side wall 534 (shown in FIG. 5), a second side wall 536 (shown in FIG. 5), a first rounded end wall 537, and a second rounded end wall 538. In the current embodiment, the first side wall 534 and the second side wall 536 are parallel to each other and the first rounded end wall 537 and second rounded end wall 538 extend between each end of first side wall 534 and the second side wall 536, defining a stadium-shaped bore 530, though other elongated slot shapes and other shapes may be present in various embodiments.

Figure 11:
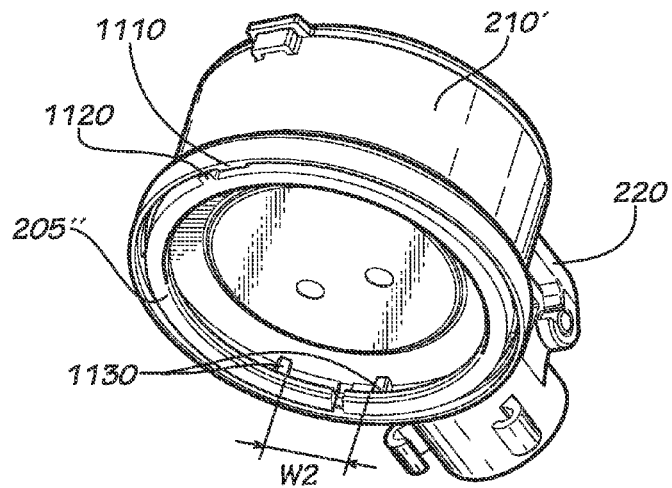
FIG. 11 is a perspective bottom view of an assembled register housing and retaining ring in accordance with another embodiment of the disclosure.

In various embodiments, register end 520 of linkage arm 190 defines a bore 510. Bore 510 can be described as an elongated slot, annular in orientation and extending through the thickness of one side of hollow linkage arm 190. Bore 510 of register end 520 of linkage arm 190 includes a bore surface 511, a first side wall 512 (shown in FIG. 5), a second side wall 513, a first rounded end wall 514, and a second rounded end wall 515 (shown in FIG. 3). In various embodiments, retaining pin 180 includes a shaft 420 which is also elongated (as shown in FIGS. 11-13) and sized such that retaining pin 180 cannot be rotated inside the stadium-shaped bore 510 of linkage arm 190 or inside bore 530 of register housing 210. Rotation of the retaining pin 180 is prevented because the distance between the first side wall 512 and the second side wall 513 of bore 510 is just large enough for the narrowest width of shaft 420 of retaining pin 180, which is equal to dimension D4 shown in FIG. 18, but is not large enough for the widest width of shaft 420 of retaining pin 180, equal to dimension D3 shown in FIG. 18.

In various embodiments, register housing 210 of register device 2000 is made from a copolyamide resin. In various other embodiments, register housing 210 is not made from a copolyamide resin but is made from another polymeric material or a material having similar properties, including but not limited to polyamides such as those in the NYLON family, polypropylene (PP) polymer resin, acrylonitrile butadiene styrene (ABS), polymers of the polyoxymethylene or acetal family such as DELRIN acetal, each with or without glass filling for strength depending on the specific application. However, the disclosure of any of these materials should not be considered limiting.

In various embodiments, linkage arm 190 of meter assembly 1000 is made from a polymer resin, a blend of polybutylene terephthalate (PBT) and polycarbonate (PC) available from SABIC Innovative Plastics. In various other embodiments, linkage arm 190 is not made from this PBT/PC blend but is made from another polymeric material or a material having similar properties, including but not limited to polyamides such as those in the NYLON family, polypropylene (PP) polymer resin, acrylonitrile butadiene styrene (ABS), polymers of the polyoxymethylene or acetal family such as DELRIN acetal, each with or without glass filling for strength depending on the specific application. However, the disclosure of any of these materials should not be considered limiting.

Also shown in FIG. 4 is the range of rotation of linkage arm 190 allowed about axis A2 due to the incorporation of bore 510 in linkage arm 190, bore 530 in register housing 210, and retaining pin 180. Due to the elongated shape of bore 510 and because it is possible for retaining pin 180 to slide within bore 510 of linkage arm 190, it is possible for the linkage arm 190 to rotate from center position C in a direction of positive angular displacement R2 to position E and it is possible for the linkage arm 190 to rotate from position C in a direction of negative angular displacement R2 to position F. In various embodiments, the maximum positive angular displacement and the maximum negative angular displacement are both equal to angle θ. In various other embodiments, the maximum positive angular displacement and the maximum negative angular displacement is not equal. In various embodiments including the current embodiment, angle θ is equal to 70 degrees. In various other embodiments, angle θ is a different angle other than 70 degrees.

Figure 5:
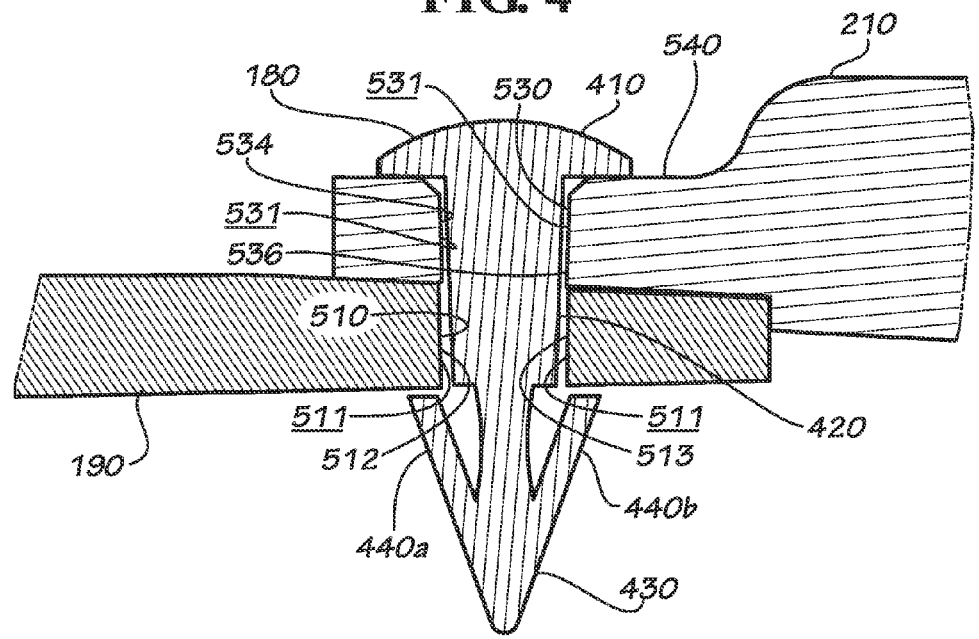
FIG. 5 is a sectional view of a retaining pin of the meter assembly of FIG. 1 inserted into the register housing and the linkage arm taken along line 5-5 in FIG. 1.

Disclosed in FIG. 5 is a sectional view of the meter assembly 1000 of FIG. 1 taken along line 5-5 in FIG. 1. In various embodiments, the retaining pin 180 is a single-use type of retaining fastener with a head 410, the aforementioned shaft 420, a tip 430, and a pair of hooks 440a,b. During installation, tip 430 of retaining pin 180 is pushed into bore 530 of socket 540 of register housing 210 after insertion of register end 520 of linkage arm 190 into bore 550 defined in socket 540 of register housing 210 to align bore 530 with bore 510. The retaining pin 180 is then also pushed into the bore 510 defined in linkage arm 190 until hooks 440a,b pass through bore 510 of register end 520 of linkage arm 190. Once installed, retaining pin 180 may not be removed from bore 530 or bore 510 without being damaged or at least without gaining access to and squeezing together the hooks 440a,b so that hooks 440a,b fit back through the bore 510 and bore 530, access which is not possible in the current embodiment with the register device 2000 completely assembled.

In various embodiments, various sizes and shapes of retaining pin 180 are contemplated, these embodiments including but not limited to a round pin, a screw, a bolt, a cotter pin, or canoe clip extending radially into matching holes in register housing 210. In various embodiments of the aforementioned retaining pin 180 and the meter assembly 1000, retaining pin 180 is removable without being damaged and is therefore able to be installed more than once. In various embodiments, the hooks 440 have a quantity other than two as shown in the current embodiment. In various embodiments, the hooks are not present. In various embodiments, retaining pin 180 is made from polypropylene (PP). In various other embodiments, retaining pin 180 is not made from polypropylene but is made from another polymeric material or a material having similar properties, including but not limited to acrylonitrile butadiene styrene (ABS), polyamides such as those in the NYLON polymer family, polymers of the polyoxymethylene or acetal family such as DELRIN acetal, each with or without glass filling for strength depending on the specific application. However, the disclosure of any of these materials should not be considered limiting.

In various embodiments, the engagement of retaining pin 180 into register housing 210 and linkage arm 190 is accompanied by a tactile and/or audible snap or click or other sound to confirm for someone who is building or servicing or otherwise handling the meter assembly 1000, retaining pin 180, or register housing 210 that engagement of the retaining pin 180 has occurred. In various embodiments, the engagement of these parts is also accompanied by a visual indication. This visual indication in various embodiments comes in the form of the underside of head 410 of retaining pin 180 coming into contact with socket 540 of register housing 210. Hooks 440a,b of retaining pin 180 is considered a snap lever in various embodiments because hooks 440a,b each function as a lever—each with a lever arm represented by a bendable portion rotatable about a pivot. In various embodiments, engagement of retaining pin 180 is not accompanied by an audible snap.

Disclosed in FIG. 6 is a top view of the retaining ring 205 of the meter assembly 1000 of FIG. 2. Retaining ring 205 includes a plurality of engagement hooks 610 spaced apart annularly by a gap distance G1 and arranged in a circular configuration extending radially outward along an outer periphery of the retaining ring 205. In various embodiments, the number of engagement hooks 610 is twenty. In various other embodiments, the number of engagement hooks 610 is more or less than twenty. Between a first end 614 and second end 615 of retaining ring 205 is another gap distance G2 at a break point 613, approximately equal to gap distance G1 in the current embodiment. Also included in retaining ring 205 and various embodiments of retaining fastener is a flange 620, which could also be considered a ring body in the current embodiment. Retaining ring 205 defines an inner diameter D2 of flange 620. Inner diameter D2 of flange 620 is less than outer diameter D1 (see FIG. 2) of engagement hooks 295a,b,c,d to ensure that retaining ring 205 is held captive by the 295a,b,c,d engagement hooks of register housing 210 once retaining ring 205 is installed. In various embodiments, retaining ring 205 of meter assembly 1000 is made from polycarbonate. In various other embodiments, retaining ring 205 is not made from polycarbonate but is made from another polymeric material or a material having similar properties, including but not limited to polyamides such as those in the NYLON family, polypropylene (PP) polymer resin, acrylonitrile butadiene styrene (ABS), polymers of the polyoxymethylene or acetal family such as DELRIN acetal, each with or without glass filling for strength depending on the specific application. However, the disclosure of any of these materials should not be considered limiting.

Disclosed in FIG. 7 is a sectional view of the retaining ring 205 of FIG. 6 taken along line 7-7 in FIG. 6. In various embodiments including that shown in FIGS. 6-7, retaining ring 205 is radially symmetrical about axis A1 along a line extending through break point 613.

Shown in FIG. 8 is a sectional detail view of the retaining ring 205 taken from detail 8 in FIG. 7. In this sectional view, retaining ring 205 is shown with a base portion 810, a bending portion 820, and a tip 830. Bending portion 820 includes at least a portion of outer wall 821 and inner wall 822. Tip 830 includes at least a portion of inner wall 822, top end 831, hook inclined wall 832, hook ledge 833, and radiused portion 834. In various embodiments, outer wall 821 is at an angle of α2 (alpha 2) from the horizontal, hook inclined wall 832 is at an angle of α1 (alpha 1) from the vertical, and hook ledge 833 is substantially horizontal. Angle α1 is less than 90 degrees in various embodiments to aid in manufacturing of or performance of the retaining ring 205. Angle α2 (alpha 2) is greater than zero degrees in various embodiments to aid in manufacturing of retaining ring 205 or to aid in assembly of the meter assembly 1000 by allowing register device 2000 to be assembled to meter device 100 with less force due to the smooth and angled shape of engagement hooks 610 of retaining ring 205. With the angled shape of engagement hooks 610, the insertion force normal to the surface of that portion of engagement hook 610 in contact with the register housing 210 is not only in the direction of the bending required for the engagement hooks 610 of retaining ring 205 to clear an engagement hook 1010 (shown in FIG. 9) of register housing 210 in order to assemble the meter assembly 1000, but that normal force in some embodiments can be made lower through use of angled mating surfaces, as a result decreasing the frictional forces encountered during assembly and therefore decreasing the overall force required to push the parts together during assembly.

In various embodiments, the thickest portion of the cross-section of retaining ring 205 is base portion 810 because the base portion 810 secures the retaining ring 205 to meter housing 110 of meter device 100. Because engagement hooks 295a,b,c,d of meter housing 110 catch onto only a portion of flange 620 of base portion 810 of retaining ring 205 in various embodiments, it can be advantageous to have a base portion 810 that is thick enough not to twist or otherwise deform under those loads because any attempt to remove register device 2000 from meter device 100 with retaining ring 205 in place places a downward force on flange 620 of base portion 810 that deforms the ring in some embodiments. In various other embodiments, some deformation of retaining ring 205 will be acceptable during an attempt to remove register device 2000 from meter device 100 with retaining ring 205 in place.

In various embodiments, it is advantageous for a portion of one or more engagement hooks 610 to shear off when register device 2000 is separated from meter device 100, for example with loading on hook ledge 833, or to otherwise visibly break when the register housing 210 of register device 2000 and the meter housing 110 of meter device 100 are separated so that it can be clear that someone or something has tampered with meter assembly 1000 by trying to remove register device 2000 and so that the proper authorities can be contacted. In various embodiments, the register device 2000 itself will sense that it has been removed from meter device 100. In various embodiments, a sensor inside of the electronic module 310 will show an electronic "flag" on display interface 315 communicating that the register has been partially or completely removed from meter device 100. In various embodiments, a sensor inside of the electronic module 310 will communicate to the wireless communication device 3000 that the register has been partially or completely removed from meter device 100 so that the proper authorities can be notified remotely without physical inspection of the meter or so that physical inspection of the meter can then be scheduled. If the retaining fastener—in this case the retaining ring 205— indicates a broken connection between the first housing, a meter housing in various embodiments, and the second housing, a register housing in various embodiments, when the second housing is subsequently disconnected from the first housing, the retaining fastener effectively serves as a tamper-detection device. In some embodiments, it is advantageous not to allow movement of register device 2000 relative to meter device 100 at all until engagement hooks 610 begin to shear or otherwise break off because the distance between the register device 2000 and the meter device 100 can have an effect on the proper operation of (i.e. accuracy and reliability) of the register device 2000 and therefore the flow readings that it produces.

Disclosed in FIG. 9 is a sectional view of the register housing 210 assembled to a retaining ring 205' and meter housing 110 in final assembled state. A maximum gap distance G3 is allowed in various embodiments between register housing 210 and meter housing 110 to allow a small amount of play between register housing 210 and meter housing 110 and to allow easy rotation of the register housing 210. Gap distance G3 is sized such that register device 2000 may record activity of meter device 100 even if the register device 2000 and the meter device 100 are spaced apart at the full gap distance G3.

Figure 10:
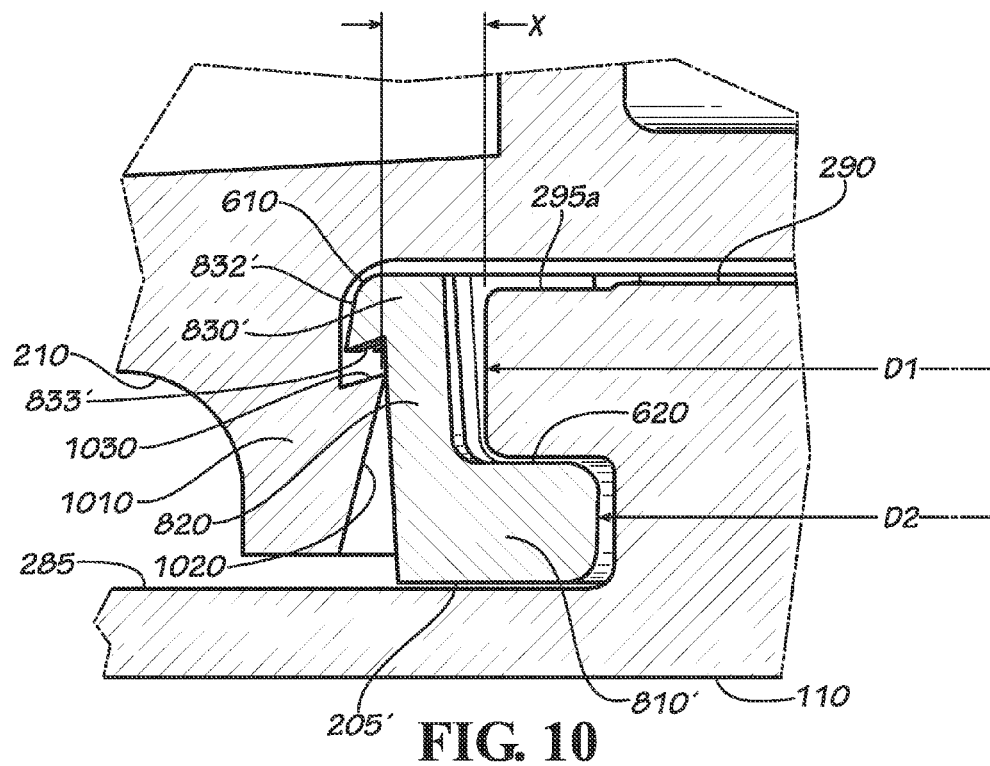
FIG. 10 is a detailed sectional view of the register housing and retaining ring of FIG. 9, together assembled with a meter housing, taken from detail 10 of FIG. 9.

The detailed sectional view of FIG. 10 shows engagement hooks 295a,c of meter housing 110 engaging, capturing, or locking in place, flange 620 of retaining ring 205', while engagement hooks 610 of retaining ring 205' are shown engaging or capturing the engagement hook 1010 of register housing 210. Engagement hook 1010 is a ring-shaped extension on the register housing 210 extending downward in the current embodiment, though the engagement hook 1010 may be a plurality of spaced engagement hooks extending downward from the register housing 210 in various embodiments. Retaining ring 205' is a variation of retaining ring 205 in which hook ledge 833' is inclined downward as hook ledge 833' extends radially outward. Hook ledge 833' of retaining ring 205' captures hook ledge 1030 of engagement hook 1010 of register housing 210 in order to prevent separation of register housing 210 from meter housing 110. When retaining ring 205 is used, hook ledge 1030 may also be horizontal in various embodiments. The meter housing 110, the register housing 210, and the retaining ring 205' are sized relative to each other such that radial spacing X between meter housing 110 and register housing 210 allows for passage of tip 830' of engagement hooks 610 of retaining ring 205' between meter housing 110 and register housing 210 during the assembly of register housing 210 to meter housing 110 (and likewise, the assembly of the entire register device 2000 to meter device 100).

Retaining rings 205,205' are assembled to meter device 100 by spreading open retaining rings 205,205' in order to increase gap distance G2 and inner diameter D2 in order for flange 620 to fit around outer diameter D1 of engagement hooks 295a,b,c,d of the mounting boss 290 of meter housing 110. Retaining rings 205,205' can then be allowed to return to their normal circular shape, now locked onto the meter housing 110. Once one of retaining rings 205,205' is attached to meter device 100, register device 2000 is lowered onto meter device 100 with the one of retaining rings 205,205' now in place. As register housing 210 of register device 2000 is lowered onto meter device 100 with the one of retaining rings 205,205' in place, inclined wall 1020 of engagement hook 1010 of register housing 210 engages and then pushes radially inward the engagement hooks 610 of the one of retaining rings 205,205'. Hook inclined walls 832,832', being inclined radially inwards to create a taper at the tips 830,830' of engagement hooks 610,1010, respectively, facilitate the radially inward movement of engagement hooks 610,1010. After inclined wall 1020 of register housing 210 clears hook inclined wall 832,832' of engagement hooks 610' of the one of retaining rings 205,205', respectively, register housing 210 is locked into place and therefore cannot be removed without damaging the one of retaining ring 205,205'.

In various embodiments, assembly of meter assembly 1000 includes aligning the register housing 210 axially with the meter housing 110, a bottom portion 212 (shown in FIG. 2) of register housing 210 facing the top portion 280 of meter housing 110, and pushing the register housing 210 onto the meter housing 110. In various embodiments, the register housing 210 is secured to the first housing with a retaining fastener such as one of retaining rings 205, 205'. In various embodiments, assembly of meter assembly 1000 will further include rotating the register housing 210 relative to the meter housing 110 to a desired rotation angle. In various embodiments, retaining ring 205,205' or other retaining fastener is adapted to show indication of a broken connection between the meter housing 110 and the register housing 210 when the meter housing 110 and the register housing 210 are subsequently separated. In various embodiments, the retaining fastener will be a separate component such as embodied in retaining ring 205,205'. In various other embodiments, retaining fastener will be incorporated into the meter housing 110 or the register housing 210.

In various embodiments, assembly of meter assembly 1000 will take place in an off-site location and installation of meter assembly 1000 will not require on-site assembly of register device 2000 to meter device 100. In various embodiments, register device 2000 will be assembled to meter device 100 on-site, with or without retaining ring 205,205', by someone other than the original manufacturer. In various embodiments, register device 2000 will be made to retrofit older meter assemblies so that retrofitted meter assemblies will incorporate one or more of the aforementioned improvements. In various embodiments, retaining ring 205, 205' will also be made to retrofit older meter assemblies together with register device 2000.

In spite of the interlocking relationship between register housing 210 and meter housing 110 through presence of one of the retaining rings 205,205', the radial symmetry provided by the connection makes it possible for the register device 2000 to rotate as much as 360 degrees or more about axis A1 (as shown in FIG. 1) relative to meter device 100 without disturbing the operation of the meter assembly 1000. In various embodiments, the register device 2000 is able to rotate more than 360 degrees relative to the meter device 100, allowing the register device 2000 to freely rotate any number of rotations and to any angle. In various other embodiments, the register device 2000 is able to rotate up to a maximum displacement R1 of 360 degrees about axis A1, with a mechanical stop preventing rotation beyond 360 degrees. In various other embodiments, the mechanical stop may be present to prevent rotation beyond an angle less than or equal to 360 degrees, such as 350 degrees, 180 degrees or 90 degrees, and the disclosed exemplary angles of rotation should not be considered limiting on the current disclosure. One possible purpose of limiting the maximum rotation of the register device 2000 relative to the remaining part of meter assembly 1000 is to prevent a user from rotating the register housing 210 multiple times to compromise the accuracy of the flow amount recorded by the meter assembly 1000.

Because register device 2000 is able to rotate with respect to meter device 100 in various embodiments, it is possible for one who builds, installs, repairs, reads, or otherwise handles meter assembly 1000 to orient register device 2000 in the orientation that is most convenient for their particular job, be it to install the meter assembly 1000, read the flow amount on the display interface 315, or even clean the enclosure in which the meter assembly 1000 is located. In various embodiments, the meter assembly 1000 will be installed in a meter pit or other enclosure with limited clearance around the meter. In these and various other embodiments, it can be advantageous to be able to rotate the register device 2000, linkage arm 190, and wireless communication device 3000 to maneuver around pipes and/or other obstructions or to cause the display interface 315 of register device 2000 to be more easily readable.

In various embodiments of the meter assembly 1000, the wireless communication device 3000 may receive signals from the remotely-located communicator, or send signals to the remotely-located communicator, or both. Because linkage arm 190 is able to rotate with respect to register device 2000, it is possible for the same individual who handles meter assembly 1000 to orient the linkage arm 190, and therefore wireless communication device 3000 and any other components of the meter assembly 1000 that might be attached, to an orientation that is most convenient for their particular job, be it to install or repair the meter assembly 1000 or to orient the wireless communication device 3000 in such an orientation that produces the best wireless connection or signal to or from the remotely-located communicator (not shown).

In various embodiments, the assembly of register housing 210 to meter housing 110 by engagement of retaining ring 205,205' is accompanied by a tactile and/or audible snap or click or other sound to confirm for someone who is building or servicing or otherwise handling the meter assembly 1000 that engagement of each of these parts of the meter assembly 1000 has occurred. In various embodiments, the engagement of these parts is accompanied by a visual indication. In various embodiments, this visual indication comes in the form of the underside of register housing 210 making contact with top surface 285 of meter housing 110. Engagement hooks 610 of retaining ring 205,205' are considered a snap lever in various embodiments because each function as a lever—each with a lever arm represented by a bendable portion rotatable about a pivot. In various embodiments, engagement of register housing 210 with meter housing 110 is not accompanied by an audible snap.

In various embodiments, structure that is similar to the engagement hooks 610 described as being part of retaining ring 205,205' is incorporated into register housing 210 and retaining rings 205,205' are therefore not required. In these various embodiments, engagement hook 1010 includes multiple segments, each sized and positioned to be bendable to slide past and then lock around or engage engagement hooks 295 of meter housing 110. In one or more of these various embodiments, engagement hooks 1010 will not be damaged during assembly of register housing 210 to meter housing 110 but will be damaged during any subsequent removal of register housing 210 from meter housing 110. In various other embodiments, engagement hooks 1010 will not be damaged during any subsequent removal of register housing 210 from meter housing 110.

In various embodiments, the engagement hooks 610 that are described as being part of the retaining rings 205,205' are incorporated into meter housing 110 and the retaining rings 205,205' are therefore not required. In these various embodiments, engagement hook 295 defines multiple segments, each sized and positioned to be bendable to slide past and then lock around or engage engagement hooks 1010. In one or more of these various embodiments, engagement hooks 295 will not be damaged during assembly of register housing 210 to meter housing 110 but will be damaged during any subsequent removal of register housing 210 from meter housing 110. In various other embodiments, engagement hooks 295 will not be damaged during any subsequent removal of register housing 210 from meter housing 110.

Shown in FIG. 11 is another embodiment of a register housing 210' and a retaining ring 205" assembled together to show the relationship between the two parts. In various embodiments, register housing 210' and retaining ring 205" cooperate with mounting boss 290 of meter housing 110 to limit the rotation of register housing 210' to no more than about one turn. In various embodiments using retaining ring 205", the register housing 210' will rotate between zero and less than 360 degrees about axis A1. In the current embodiment, register housing 210' rotates between zero and 350 degrees about axis A1. Included as part of register housing 210' is a tab 1110. Included as part of retaining ring 205" is a tab 1120 and a pair of tabs 1130. The inside vertical walls of tabs 1130—specifically those inside vertical walls substantially facing each other—are shown spaced apart at a distance W2. In various embodiments, W2 will be larger than width W1 of engagement hooks 295a,b,c,d (shown in FIG. 2) to allow retaining ring 205" to install on meter housing 110 such that the first tab 1130 is on one side of a one of the engagement hooks 295a,b,c,d and the second tab 1130 is on the other side of that same engagement hook 295a,b,cd.

Figure 12A:
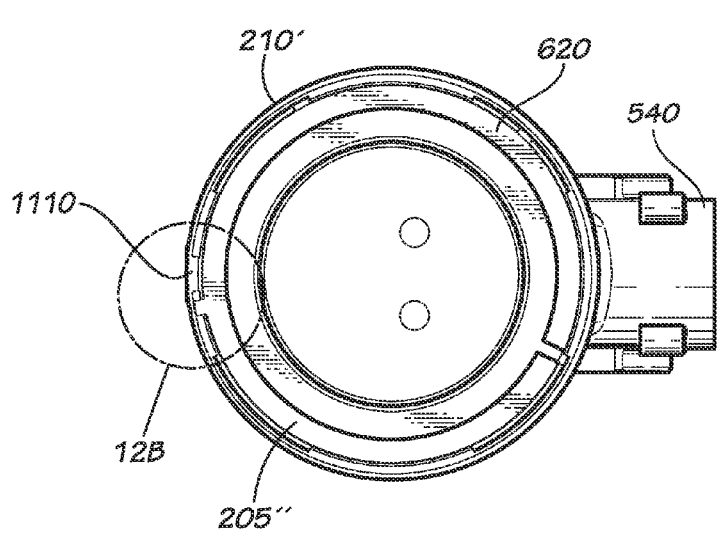
FIG. 12A is a bottom view of the assembly of FIG. 11.
Figure 13:
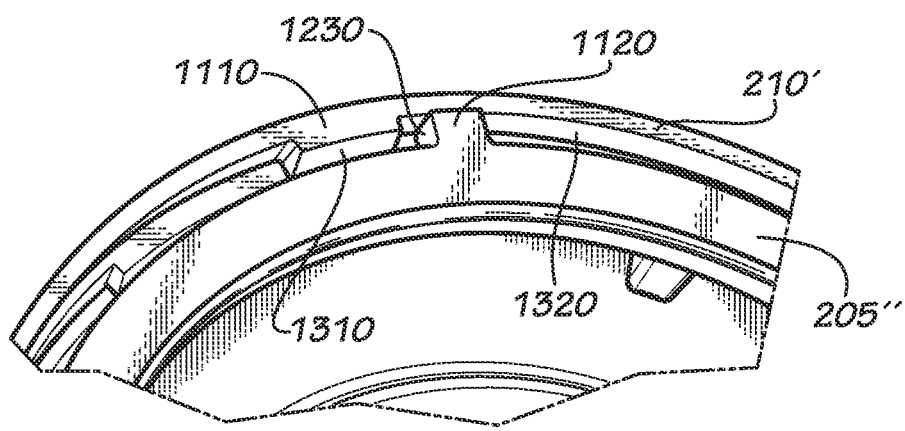
FIG. 13 is a detailed perspective view of the assembly of FIG. 11.

FIG. 12A shows a bottom view of the assembly of the register assembly 210' and the retaining ring 205" shown in FIG. 11. In the current embodiment, tab 1110 of register housing 210' is positioned approximately 180 degrees from socket 540 or on the side of register housing 210' opposite socket 540 when viewed from below the register housing 210', though the tab 1110 may be positioned at a different angle relative to socket 540 in various embodiments.

Figure 12B:
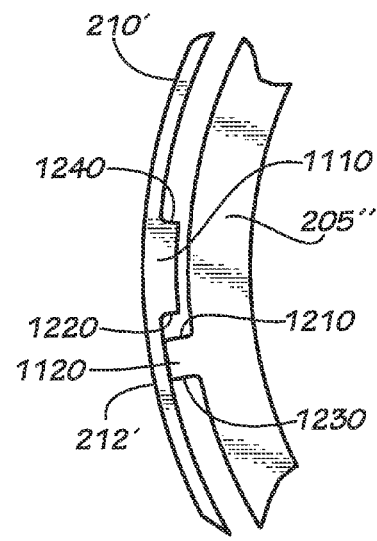
FIG. 12B is a detailed bottom view of the assembly of FIG. 11 taken from detail 12B of FIG. 12A.

FIG. 12B is a detailed view taken from detail 12B in FIG. 12A showing tab 1110 of bottom portion 212' of register housing 210' and tab 1120 of retaining ring 205". Tab 1110 of register housing 210' defines a first side 1220 and a second side 1240. Tab 1120 of retaining ring 205" defines a first side 1210 and a second side 1230. While the space between retaining ring 205" and register housing 210' is relatively small in various embodiments to help maintain the locking relationship between the register housing and meter housing during assembly, there is enough space for retaining ring 205" to rotate within register housing 210 without binding.

FIG. 13 is a detailed perspective view of the assembly of FIG. 11 showing the interaction between tab 1110 of register housing 210' and retaining ring 205". FIG. 13 additionally shows inside wall 1310 of tab 1110 of register housing 210' and inside wall 1320 of register housing 210'.

Figure 14:
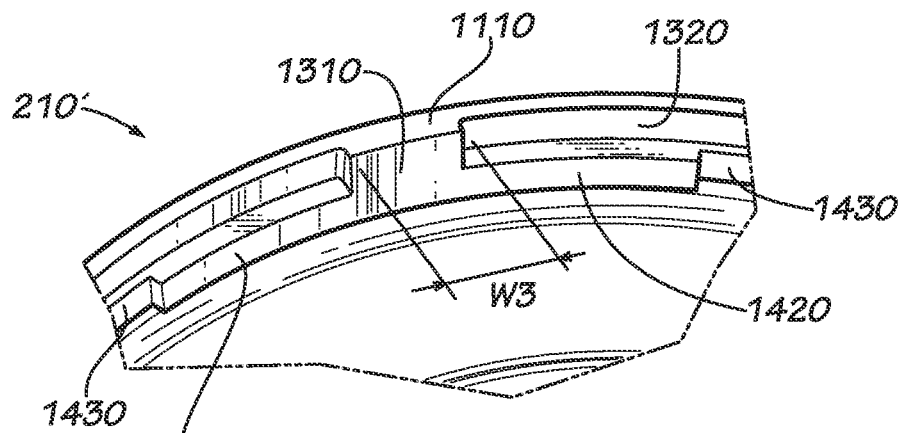
FIG. 14 is a detailed perspective view of the register housing of the assembly of FIG. 11.
Figure 15:
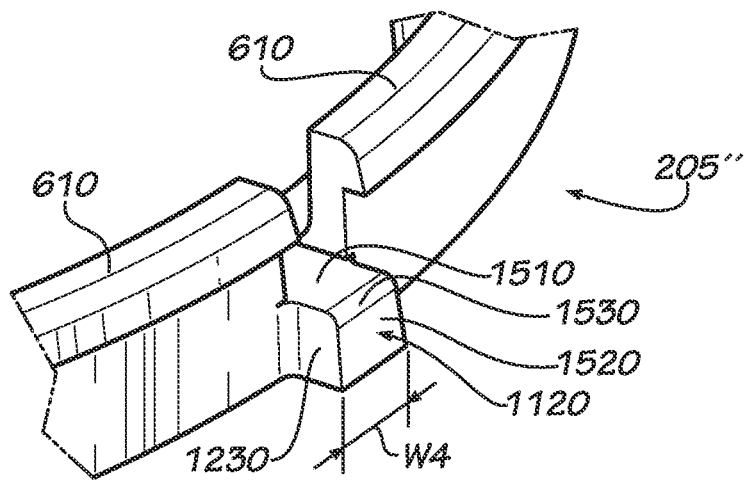
FIG. 15 is a detailed perspective view of the retaining ring of the assembly of FIG. 11.

FIG. 14 is a detailed perspective view of the register housing 210' of the assembly of FIG. 11. FIG. 14 shows inner walls 1410,1420 and inner wall 1430 of register housing 210'. Tab 1110 of register housing 210' has a width W3 as shown. In various embodiments, width W3 is sized such that when rotated about axis A1 and with respect to retaining ring 205", tab 1110 of register housing 210' will not be damaged, even if the first side 1220 of tab 1110 of register housing 210' and the second side 1230 of tab 1120 of retaining ring 205" (or if the second side 1240 of tab 1110 of register housing 210' and the first side 1210 of tab 1120 of retaining ring 205") are made to bear against one another at maximum rotational force or maximum torque. In various embodiments and based on the sizing of tab 1120 relative to tab 1110, it will be tab 1120 of retaining ring 205" that breaks under these conditions because the cost to repair or replace retaining ring 205" is typically lower than the cost to repair or replace register housing 210'. In various embodiments, inner wall 1430 of register housing 210' will be radially outside inner walls 1310,1410,1420 of register housing 210. The position of inner walls 1310,1410,1420 results in a thicker wall at bottom portion 212' of register housing 210' in the proximity of tab 1110 in various embodiment in order to provide additional reinforcement for tab 1110, FIG. 15 is a detailed perspective view of the retaining ring of the assembly of FIG. 11. Particularly visible in FIG. 15 is the detailed geometry of tab 1120 of retaining ring 205". Shown between one pair of engagement hooks 610 is tab 1120, including a top 1510, an outside wall 1520, and a radiused portion 1530 at the intersection of top 1510 and outside wall 1520. Tab 1120 of retaining ring 205" defines a width W4 as shown. In various embodiments, outside wall 1520 of tab 1120 is radially outside the inner wall 1310 of register housing 210' in such a way that tab 1110 and tab 1120 cannot rotate past one another.

Retaining ring 205" is assembled to meter device 100 by spreading open retaining rings 205" in order to increase gap distance G2 and inner diameter D2 in order for flange 620 to fit around outer diameter D1 of engagement hooks 295a,b,c,d of the mounting boss 290 of meter housing 110 such that tabs 1130 are positioned on either side of a one of the engagement hooks 295a,b,c,d. Retaining ring 205" can then be allowed to return to its normal circular shape, now locked onto the meter housing 110. Once retaining ring 205' is attached to meter device 100, register device 2000 is lowered onto meter device 100 with the retaining ring 205" now in place. As register housing 210' of register device 2000 is lowered onto meter device 100 with the retaining ring 205" in place, inclined wall 1020 of engagement hooks 1010 of register housing 210' engages and then pushes radially inward the engagement hooks 610 of the retaining ring 205". Hook inclined walls 832,832', being inclined radially inwards to create a taper at the tips 830,830' of engagement hooks 610,1010, respectively, facilitate the radially inward movement of engagement hooks 610,1010. After inclined wall 1020 of register housing 210' clears hook inclined wall 832,832' of engagement hooks 610' of the retaining ring 205", respectively, register housing 210' is locked into place and therefore cannot be rotated past the maximum rotation angle or removed without damaging the retaining ring 205".

In various embodiments, assembly of meter assembly 1000 includes aligning the register housing 210' axially with the meter housing 110, a bottom portion 212 (shown in FIG. 2) of register housing 210' facing the top portion 280 of meter housing 110, and pushing the register housing 210 onto the meter housing 110. In various embodiments, the register housing 210' is secured to the first housing with a retaining fastener such as retaining ring 205". In various embodiments, assembly of meter assembly 1000 will further include rotating the register housing 210' relative to the meter housing 110 to a desired rotation angle which, in the current embodiment, is no more than about one turn. In various embodiments, retaining ring 205" or other retaining fastener is adapted to show indication of a broken connection between the meter housing 110 and the register housing 210' when the meter housing 110 and the register housing 210' are subsequently separated. In various embodiments, the retaining fastener will be a separate component such as embodied in retaining ring 205". In various other embodiments, retaining fastener will be incorporated into or integral with the meter housing 110 or the register housing 210'.

In various embodiments, assembly of meter assembly 1000 takes place in an off-site location and installation of meter assembly 1000 does not require on-site assembly of register device 2000 to meter device 100. In various embodiments, register device 2000 is assembled to meter device 100 on-site, with or without retaining ring 205", by someone other than the original manufacturer. In various embodiments, register device 2000 is made to retrofit older meter assemblies so that retrofitted meter assemblies will incorporate one or more of the aforementioned improvements. In various embodiments, retaining ring 205" is also made to retrofit older meter assemblies together with register device 2000.

Figure 16:
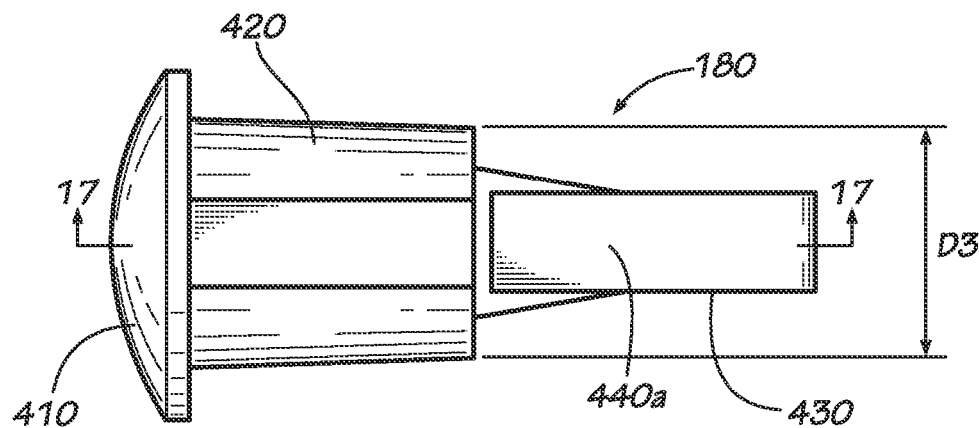
FIG. 16 is a side view of the retaining pin of FIG. 5.
Figure 17:
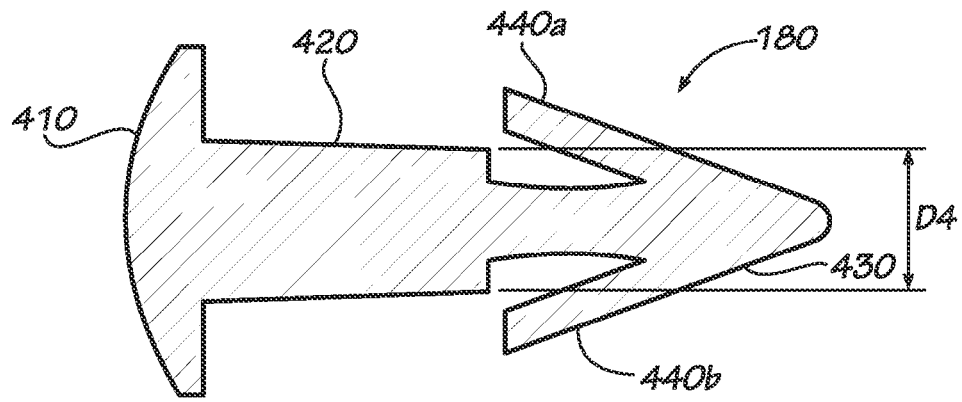
FIG. 17 is a sectional view of the retaining pin of FIG. 5 taken along line 17-17 in FIG. 16.
Figure 18:
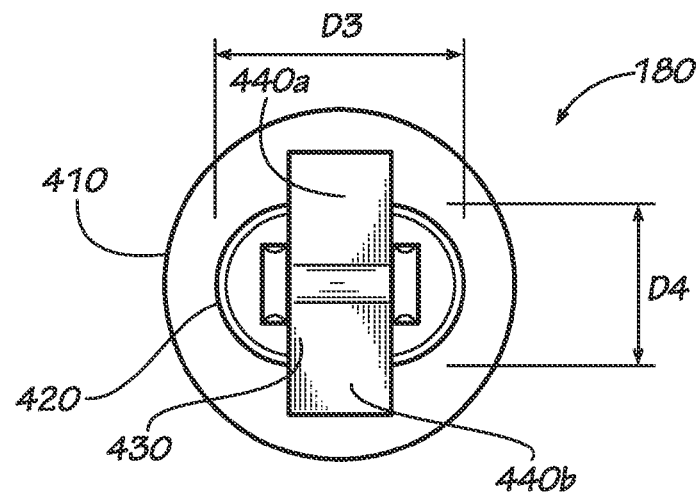
FIG. 18 is an end view of the retaining pin of FIG. 5.

FIG. 16 shows a side view of retaining pin 180, FIG. 17 shows a sectional view of retaining pin 180 taken along line 17-17 in FIG. 16, and FIG. 18 shows an end view of retaining pin 180. Shown in FIG. 18 is the elongated shape of shaft 420 of the retaining pin 180 of the current embodiments. The narrow width of shaft 420 is represented by dimension D4 and the wide width of shaft 420 is represented by dimension D3. In various other embodiments, the retaining pin 180 has a shaft that is not elongated. The description of retaining pin 180 is not intended to be limiting on the present disclosure as other retaining pins 180 and retaining fasteners are considered as part of this disclosure.

During use of meter assembly 1000 in a water distribution system, water travels through the meter device 100 originating from a water source and entering in inlet 120. Water is permitted to travel through the meter and out of the outlet 130. Once the water exits the outlet 130, the water flows through the downstream piping system and, ultimately, to one or more user terminals. Fluids other than water may flow through meter assembly 1000 in various other embodiments, and the disclosure of water should not be considered limiting.

As previously stated, the meter in various embodiments is a nutating disc displacement flow meter. In a nutating disc displacement flow meter, the water passing through the meter (not shown) moves a nutating disc (not shown) causing a meter magnet (not shown) to rotate. The rotation of the meter magnet causes the electronic module 310 of the register device 2000 to log the motion, leading to a measurement of water usage and a readout of water usage from the register device 2000.

A register circuit (not shown) in the electronic module 310 is configured to log the readout of water usage at preset timing intervals in various embodiments. In the current embodiment, the register circuit remains in a low power mode for the majority of its operating life. Low power, as used in this disclosure, means that the register circuit is using a very small amount of power when compared to the normal operating mode. This is commonly referred to as being in a "sleep mode." The register circuit "wakes up" at preset timing intervals to read the register and log the readout. In various embodiments, a wireless communication circuit (not shown) in the wireless communication device 3000 is connected with the register circuit via wires (not shown). In various embodiments, these wires are routed through the linkage arm 190. The wireless communication circuit obtains the log of the register circuit and transmits the log to a remotely-located communicator at preset timing intervals. The preset timing interval of the wireless communication device 3000 may or may not be the same preset timing interval as that of the register circuit. In various other embodiments, a separate register circuit may not be necessary if the wireless communication device 3000 is capable of directly determining the measurement of water usage of the register device 2000.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A meter assembly comprising:
    a first housing comprising a top portion, the top portion comprising a mounting boss, the mounting boss comprising an engagement hook and protruding axially from a top surface of the top portion of the first housing;
    a second housing connected to the top portion of the first housing, a bottom surface of the second housing facing the top surface of the first housing; and
    a retaining fastener connecting the second housing to the first housing and held captive between the top surface of the first housing and the bottom surface of the second housing, the second housing adapted to rotate relative to the first housing about a central axis of the first housing and a central axis of the second housing while the central axis of the second housing is aligned with the central axis of the first housing and the second housing is fully assembled to the first housing.

2. The meter assembly of claim 1, wherein the retaining fastener includes a plurality of engagement hooks adapted to engage one of the first housing and the second housing and a flange adapted to engage one of the first housing and the second housing.

3. The meter assembly of claim 2, wherein the plurality of engagement hooks are arranged in a circular configuration extending radially outward along an outer periphery of the retaining fastener and wherein each of the plurality of engagement hooks is a snap lever.

4. The meter assembly of claim 1, wherein the retaining fastener is adapted to visibly break when the first housing and the second housing are separated.

5. The meter assembly of claim 1, wherein the second housing is adapted to rotate less than or equal to 360 degrees relative to the first housing.

6. The meter assembly of claim 1, wherein the retaining fastener includes a flange adapted to engage one of the first housing and the second housing.

7. The meter assembly of claim 1, wherein the retaining fastener is a retaining ring.

8. The meter assembly of claim 7 further comprising a meter device and a register device, the meter device including an inlet and an outlet, the meter device including the first housing and the register device including the second housing.

9. The meter assembly of claim 8, wherein the engagement hook of the meter device is engageable with the retaining ring.

10. The meter assembly of claim 8, wherein the register device includes at least one engagement hook facing radially inward, the at least one engagement hook of the register device engageable with the retaining ring.

11. A meter assembly comprising:
a housing defining a first axis aligned with a main axis of the meter assembly and a second axis angled with respect to the first axis;
a linkage arm; and
a retaining fastener connecting the linkage arm to the housing, the linkage arm adapted to rotate about the second axis relative to the housing while in operation, the linkage arm fixed in an axial direction defined by the second axis of the housing and an axis of the linkage arm.

12. The meter assembly of claim 11, wherein the retaining fastener is a retaining pin, the retaining pin including at least one engagement hook, the retaining pin extending through a hole defined in the housing and a slot defined in the linkage arm.

13. The meter assembly of claim 12, wherein the linkage arm includes an outer wall defining an elongated slot sized to accept the retaining pin, the retaining pin slidable within the elongated slot to allow the linkage arm to rotate relative to the housing.

14. The meter assembly of claim 11 further comprising:
a register device including the housing; and
a wireless communication device connected to the linkage arm.

15. A method of assembling a meter assembly including a register housing and a meter housing, the method comprising:
aligning the register housing with the meter housing;
securing the meter housing to the register housing with a retaining fastener by pushing the register housing onto the meter housing so that a bottom surface of the register housing faces a top surface of the meter housing, the retaining fastener held captive between the top surface of the meter housing and the bottom surface of the register housing; and
rotating the register housing relative to the meter housing about a common axis to a desired rotation angle.

16. The method of claim 15, wherein the retaining fastener is adapted visibly break when the meter housing and the register housing are separated after securing the meter housing to the register housing.

17. The method of claim 15, further comprising rotating a linkage arm to a desired rotation angle, the linkage arm connected to the register housing with a second retaining fastener, the linkage arm connecting the register housing to a wireless communication device.

18. The method of claim 15, wherein the register housing is adapted to rotate less than or equal to 360 degrees relative to the meter housing.

19. The method of claim 15, wherein the retaining fastener is a retaining ring having a ring body and a plurality of engagement hooks extending radially outward from the ring body.

20. The method of claim 19, wherein pushing the register housing onto the meter housing includes engaging the plurality of engagement hooks of the retaining ring with at least one engagement hook on the register housing, each engagement hook of the register housing facing radially inward.

* * * * *